Nov. 21, 1944.  V. N. CALIA  2,363,395
METHOD OF MAKING PIE
Filed May 28, 1943
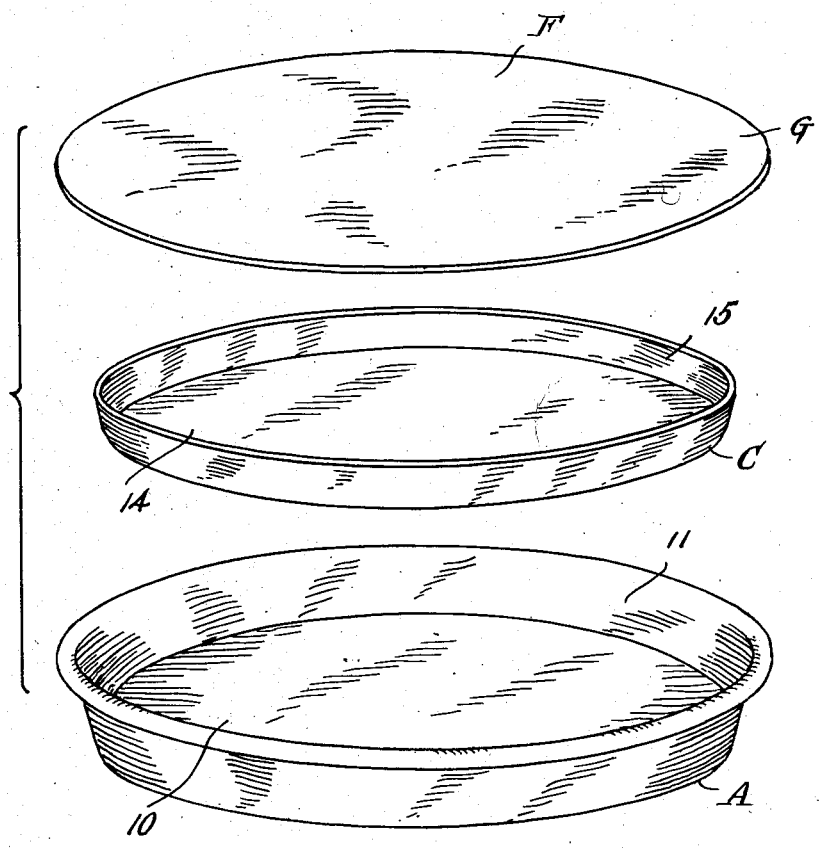
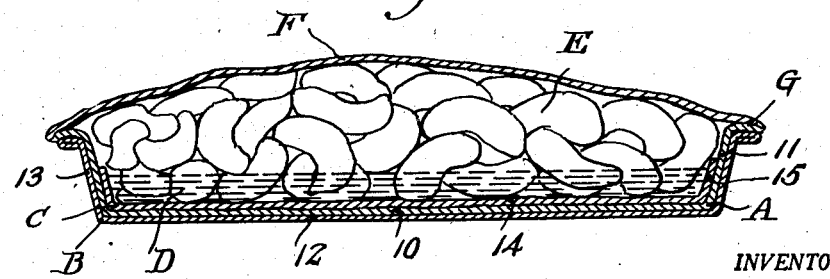
INVENTOR.
VICTOR N. CALIA
BY Clark & Ott
ATTORNEYS Patented Nov. 21, 1944

2,363,395

UNITED STATES PATENT OFFICE 2,363,395

METHOD OF MAKING PIES

Victor N. Calia, Brooklyn, N. Y.

Application May 28, 1943, Serial No. 488,812

2 Claims. (Cl. 99—86)

This invention relates to the art of making pastry and refers more particularly to an improved pie and method of making the same.

It is a well recognized fact that one of the major faults inherent in pies, particularly those produced commercially is the soggy, unpalatable and indigestible texture of the bottom crust. This is due to various reasons but where the dough is of a proper texture it can be attributed to the fact that the liquids or juices of the filling soak into and become absorbed by the raw uncooked layer of dough which is supposed to form the bottom crust thereby preventing the proper baking of the same.

In order to overcome this fault, the present invention comprehends an improved pie either of the open type or having a top crust and which includes a pre-baked lining for the bottom crust forming layer of dough which lining is located within and overlies the said layer prior to the emplacement of the filling therein and the baking of the pie, so that said lining, which due to its pre-baking, is rendered impervious to the liquid or juices, serves as a receptacle for and prevents the juices from reaching the raw dough of the bottom crust forming layer and the absorption of the same thereby.

The invention also resides in a method of making pies which consists in initially baking a bottom crust lining having an upstanding marginal rim, placing said pre-baked bottom crust lining in nested relation to and within a bottom crust forming layer of dough arranged in a pie tin, placing the filling in said nested assembly, applying a top crust thereover if used and then baking the pie in the usual manner.

With the above enumerated and other objects in view, the invention is set forth in greater detail in the following specification, particularly pointed out in the appended claims and illustrated in the accompanying drawing, in which:

Fig. 1 is a collective perspective view of the bottom crust forming layer of dough, the pre-baked lining and the top crust in separated juxtaposition.

Fig. 2 is a vertical transverse sectional view through the pie showing the same arranged in a pie tin.

Referring to the drawing by characters of reference A designates generally the bottom crust forming layer of dough which includes a bottom wall 10 and an upstanding marginal rim 11 of a size to extend from the bottom wall 12 of the pie tin B to the upper edge of the marginal rim 13 of said pie tin.

An edible lining of crust forming dough designated generally by the reference character C includes a bottom wall 14 and a marginal rim 15 which rim is preferably of lesser height than the height of the rim 11 of the bottom crust forming layer of dough A but of a sufficient height to provide a receptacle which is adapted to contain the maximum amount of juice D in the filling E of the pie. The lining C is of a size and shape corresponding approximately to the size and shape of the bottom crust forming layer of dough A and is adapted to nest therein and snugly fit the same. The lining C is pre-baked preferably for a lesser length of time than the time ordinarily employed in baking a pie, that is, said lining is partially baked so as to set the dough sufficiently to render the lining impervious to the filling juices or liquids.

In making the pie the lining C is first pre-baked and after the bottom crust forming layer of dough is arranged in the pie tin B, the pre-baked lining is positioned within said bottom crust forming layer to snugly fit or nest therewith as illustrated in Fig. 2 of the drawing with the bottom wall 14 of the lining overlying the bottom wall 10 of the bottom crust forming layer of dough and with the marginal rim 15 of the lining snugly fitting within the marginal wall 11 of said bottom crust forming layer of dough. The filling E is then placed within the nested lining and crust forming layers and any juices or liquids D which are initially in the filling or which are subsequently produced by the baking of the pie will be retained in the pre-baked lining and prevented from contact with the raw dough of the bottom crust forming layer A. If the pie is of the type which has a top crust, the top crust forming layer of dough F is placed over the filling E with the marginal edges G, of said layer F impinged against the marginal edge of the rim 11 of the bottom crust forming layer.

The assembly thus arranged within the pie tin B is then placed in the oven and baked in the usual manner. During the baking process the partially pre-baked lining C will be further baked but the baking thereof will be effected at a lesser rate than the rate at which the bottom and top crust forming layers are baked so that the lining C will be fully done simultaneously with said top and bottom crusts. The lining also tends to adhere to and become homogeneous with or an integral part of the bottom crust and is therefore imperceptible when the pie is cut and consumed. By preventing the juices or liquids of the filling from reaching the raw dough of the bottom crust forming layer and becoming absorbed thereby before said layer is baked, the sogginess thereof is prevented and the same is therefore properly baked which renders it more digestible and palatable.

What is claimed is:

1. A method of making a pie, consisting in pre-baking an edible lining for the bottom crust forming layer of dough to such an extent as to render said lining impervious to the moisture of the juices of the pie filling, positioning the bottom crust forming layer of dough within a pie tin, arranging said edible pre-baked lining within said bottom crust forming layer of dough in nested relation thereto, emplacing the filling within said assembly and baking the same.

2. A method of making a pie, consisting in partially pre-baking an edible lining for the bottom crust forming layer of dough to such an extent as to render said lining impervious to the moisture of the juices of the pie filling, positioning the bottom crust forming layer of dough within a pie tin, arranging said edible pre-baked lining within said bottom crust forming layer of dough in nested relation thereto, emplacing the filling within said assembly and baking the same to thus complete the baking of the partially pre-baked lining.

VICTOR N. CALIA.